(12) United States Patent
Tsuji et al.

(10) Patent No.: US 7,394,748 B2
(45) Date of Patent: Jul. 1, 2008

(54) METHOD AND APPARATUS FOR OPTICAL DISK RECORDING CAPABLE OF REDUCING SETTLING TIME AND GENERATING AN ACCURATE CHANNEL CLOCK SIGNAL

(75) Inventors: Masaaki Tsuji, Ohsaka-fu (JP); Ryohsuke Sugiyama, Ohsaka-fu (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 11/705,939

(22) Filed: Feb. 14, 2007

(65) Prior Publication Data
US 2007/0147203 A1 Jun. 28, 2007

Related U.S. Application Data

(63) Continuation of application No. 10/723,359, filed on Nov. 25, 2003, now Pat. No. 7,200,082.

(30) Foreign Application Priority Data
Nov. 28, 2002 (JP) ............................. 2002-345918

(51) Int. Cl.
*G11B 7/00* (2006.01)
(52) U.S. Cl. ............................ 369/124.01; 369/124.15; 369/124.09
(58) Field of Classification Search ............ 369/124.01, 369/47.1, 124.04, 124.05, 124.12, 124.15, 369/124.09
See application file for complete search history.

(56) References Cited

U.S. PATENT DOCUMENTS

| 5,537,379 | A | 7/1996 | Kimura et al. |
| 6,735,159 | B2 | 5/2004 | Sugiyama |
| 7,023,781 | B2 | 4/2006 | Tsuji |
| 7,151,732 | B2 | 12/2006 | Tsuji |

FOREIGN PATENT DOCUMENTS

| JP | 2000-173195 | 6/2000 |
| JP | 2001-6297 | 1/2001 |

OTHER PUBLICATIONS

U.S. Appl. No. 09/934,661 to Tsuji, filed Sep. 13, 1999.

*Primary Examiner*—Nabil Hindi
(74) *Attorney, Agent, or Firm*—Cooper & Dunham, LLP

(57) ABSTRACT

An optical disk recording apparatus includes a first comparator, a second comparator, a third comparator, a selection circuit, a control voltage generator, a voltage control oscillator, and a control circuit. The first comparator compares frequency-divided signals to output an error signal. The second and third comparators compare a signal pre-recorded on an optical disk and the frequency-divided signal to output an error signal and a frequency differential signal. The selection circuit selects any one of the error signals to output the signal selected. The control voltage generator generates a control voltage from the signal from the selection circuit. The voltage control oscillator generates and outputs the write reference clock signal having a frequency corresponding to the control voltage from the control voltage generator. The control circuit controls operations of the selection circuit according to the frequency differential signals.

10 Claims, 3 Drawing Sheets

METHOD AND APPARATUS FOR OPTICAL DISK RECORDING CAPABLE OF REDUCING SETTLING TIME AND GENERATING AN ACCURATE CHANNEL CLOCK SIGNAL

CROSS-REFERENCE TO RELATED APPLICATION

This application is a Rule 1.53(b) Continuation of U.S. Ser. No. 10/723,359, filed Nov. 25, 2003 now U.S. Pat. No. 7,200,082 the entire contents of which are incorporated by reference herein.

BACKGROUND

1. Field

This application generally relates to an optical recording apparatus for recording data on optical disks such as a CD-R/RW, a DVD+R/RW, a DVD-R/RW, and, in particular, to an optical recording apparatus which employs a constant angular velocity (CAV) recording method.

2. Discussion of the Background

In conventional optical disk recording apparatuses, a constant linear velocity (CLV) method has been employed for recording information on optical disks. In the CLV method where a channel clock signal used as a reference for recording/reproducing is constant regardless of a position in a radius of a disk, a channel clock signal is generated from a constant reference clock signal from outside generated by using a crystal or the like. In these days, however, in order to increase a recording speed and to reduce power consumption in recording onto optical disks, a constant angular velocity (CAV) recording method has been employed for DVD recording standards. For example, Japanese Patent Laid-Open Application Publications, No. 2001-6297 and No. 2000-173195, describe optical disk apparatuses employing the CAV method for reading out data from optical disks.

SUMMARY

This application describes a novel optical disk recording apparatus that records information on a recordable optical disk employing a constant angular velocity recording method and generates a write reference clock signal used for obtaining recording timing in a data-recording operation on the optical disk. In one example, a novel optical disk recording apparatus includes a first comparator, a second comparator, a third comparator, a selection circuit, a control voltage generator, a voltage control oscillator, and a control circuit. The first comparator is configured to compare phases and frequencies between a frequency-divided signal of a predetermined reference clock signal input from outside and a frequency-divided signal of the write reference clock signal, and to output a first error signal representing comparison results. The second comparator is configured to compare phases and frequencies between a first signal recorded beforehand on the optical disk and the frequency-divided signal of the write reference clock signal, and to output a second error signal representing comparison results and a first frequency differential signal representing a frequency difference. The third comparator is configured to compare phases and frequencies between one of the first signal and a second signal recorded beforehand on the optical disk and the frequency-divided signal of the write reference clock signal, and to output a third error signal representing comparison results and a second frequency differential signal representing a frequency difference. The selection circuit is configured to select any one of the first through third error signals output from the first through third comparators, respectively, and to exclusively output the signal selected. The control voltage generator is configured to generate a control voltage from the signal output from the selection circuit, and to output the control voltage. The voltage control oscillator is configured to generate and output the write reference clock signal having a frequency corresponding to the control voltage input from the control voltage generator. The control circuit is configured to control operations of the selection circuit according to the first and second frequency differential signals.

The control circuit may be configured to cause the selection circuit to select and exclusively output the first error signal as the write reference clock signal during a predetermined time period t0 as an initial action of a start-up operation of the apparatus.

The control circuit may be configured to cause the selection circuit to select and exclusively output the second error signal as the write reference clock signal after a lapse of the predetermined time period t0.

The control circuit may be configured to cause the selection circuit to select and exclusively output the third error signal as the write reference clock signal when a difference in frequency indicated by the first frequency differential signal output from the second comparator is smaller than or equal to a predetermined value $\alpha$.

The control circuit may be configured to cause the selection circuit to select and exclusively output the second error signal as the write reference clock signal when a difference in frequency indicated by the second frequency differential signal output from the third comparator is greater than or equal to a predetermined value $\beta$ which is smaller than the value $\alpha$.

The control circuit may be configured to detect tracking status during the recording process on the optical disk, and when an off-tracking is detected after a lapse of the predetermined time period t0 from the start-up operation, the control circuit causes the selection circuit to stop outputting the first, second, or third error signal during a predetermined time period t1.

The control circuit may be configured to cause the selection circuit to select and exclusively output the first error signal as the write reference clock signal after a lapse of the predetermined time period t1.

The control circuit may be configured to cause the selection circuit to select and exclusively output the second error signal when tracking is established within the predetermined time period t1.

The first signal may be a wobble signal.

The second signal may be a land pre-pit signal.

The one of the first and second signals may be determined according to a type of the optical disk.

This application further describes a novel method of recording information on a recordable optical disk employing a constant angular velocity recording method and generating a write reference clock signal used for obtaining recording timing in a data-recording operation on the optical disk. In one example, a novel method includes the steps of first comparing, second comparing, third comparing, selecting, control voltage generating, write reference clock signal generating, and controlling. The first comparing step compares phases and frequencies between a frequency-divided signal of a predetermined reference clock signal input from outside and a frequency-divided signal of the write reference clock signal to output a first error signal representing comparison results. The second comparing step compares phases and frequencies between a first signal recorded beforehand on the optical disk and the frequency-divided signal of the write reference clock signal to output a second error signal representing comparison results and a first frequency differential signal representing a frequency difference. The third comparing step compares phases and frequencies between one of the first signal and a second signal recorded beforehand on the optical disk and the frequency-divided signal of the write reference clock signal to output a third error signal representing comparison results and a second frequency differential signal representing a frequency difference. The selecting step selects any one of the first through third error signals output from the first through third comparing steps, respectively. The control voltage generating step generates a control voltage from the signal selected in the selecting step. The write reference clock signal generating step generates the write reference clock signal having a frequency corresponding to the control voltage input in the controlling step. The controlling step controls operations of the selecting step according to the first and second frequency differential signals.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF PREFERRED EMBODIMENTS

Figure 1:
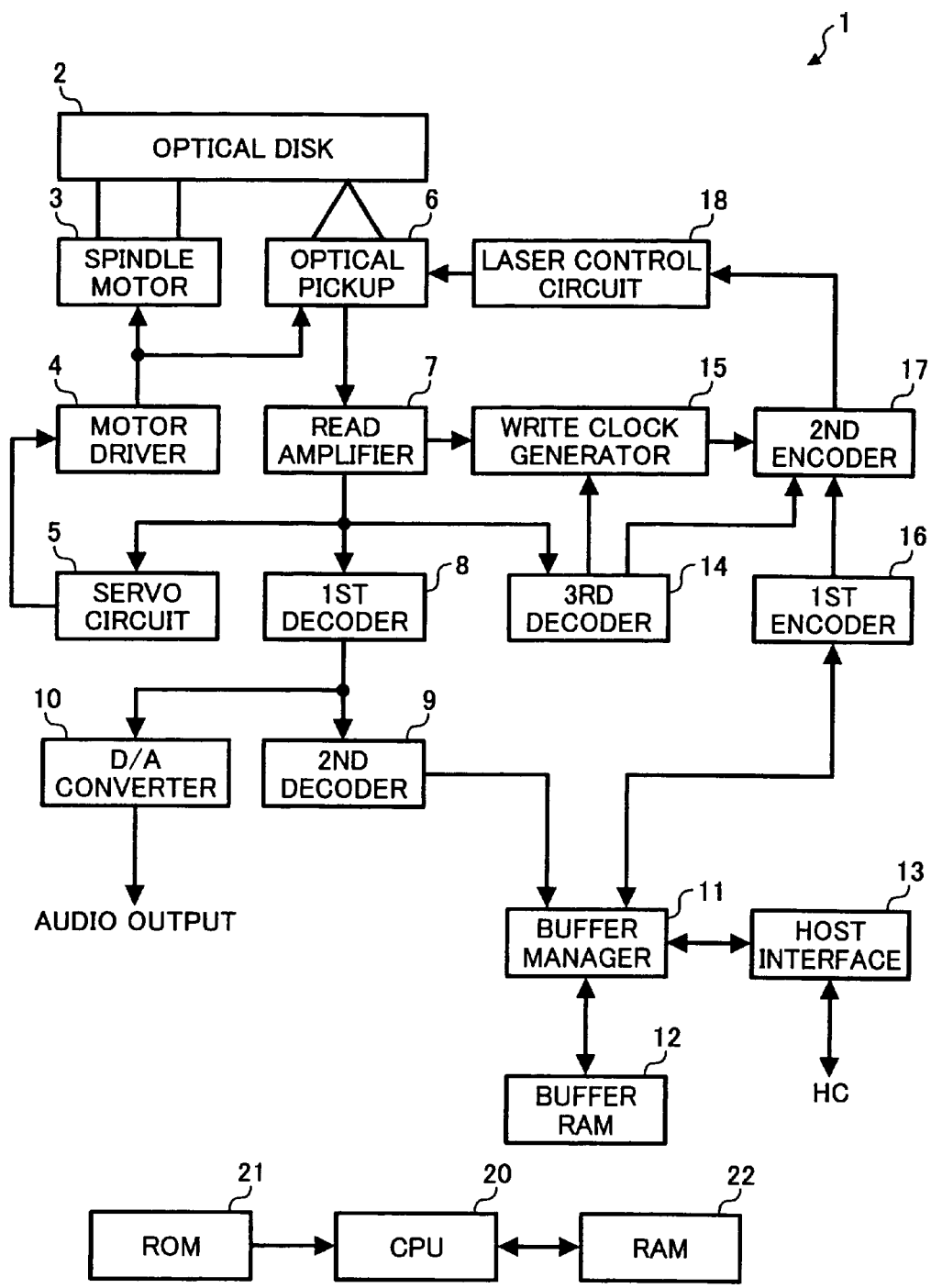
FIG. 1 is a block diagram showing an outline structure of an optical disk recording apparatus according to an exemplary embodiment.

In describing preferred embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner. Referring now to the drawings, wherein like reference numerals designate identical or corresponding parts throughout the several views, particularly to FIG. 1, an optical disk recording apparatus 1 according to an exemplary embodiment of the present specification is described. In FIG. 1, the optical disk recording apparatus 1 includes a spindle motor 3, a motor drive 4, a servo circuit 5, an optical pickup 6, a read amplifier 7, a first decoder 8, a second decoder 9, a D/A converter 10, a buffer manager 11, a buffer RAM 12, a host interface 13, a third decoder 14, a write clock generator 15, a first encoder 16, a second encoder 17, a laser control circuit 18, a CPU 20, a ROM 21, and a RAM 22. The optical disk recording apparatus 1 records data onto an optical disk 2 such as a CD-R/RW, a DVD+R/RW, and a DVD-R/RW. The optical disk 2 which contains data for audio and/or for personal computers, for example, is driven to spin by the spindle motor 3. The spindle motor 3 spins under control by the motor driver 4 and the servo circuit 5.

The optical pickup 6 which reads and writes data on the optical disk 2 includes various components including a laser generator, an optical system, a focus actuator, a track actuator, a light receiving element, and a position sensor, which are not shown. The laser generator may be a laser diode, for example. The optical pickup 6 irradiates a laser beam on the optical disk 2 to read data from or write data onto the disk.

In a reading operation for reading out data from the optical disk 2 (i.e., a data reproduction process), a reproduction signal read out by the optical pickup 6 is amplified and is binarized by the read amplifier 7. The first decoder 8 decodes the data amplified and binarized by the read amplifier 7 by carrying out an eight-to-fourteen modulation (EFM) demodulation and a CIRC (Cross Interleaved Read-solomon Code) operation such as a de-interleave or an error correction, for example, when the optical disk has a CD format, or an eight-to-sixteen demodulation when the optical disk has a DVD format. The first decoder 8 outputs the decoded data generated for audio or personal computer use to the second decoder 9. If the decoded data is generated for audio use, the D/A converter 10 performs digital-to-analog conversion on the data and outputs a resultant audio signal.

The second decoder 9 stores the decoded data (e.g., audio or computer data) in the buffer RAM 12 through a buffer manager 11 successively, and carries out an error correction in order to improve reliability on the data stored in the buffer RAM 12. In the error correction, the second decoder 9 and the buffer RAM 12 exchange data, such as reading out data stored in the buffer RAM 12 and writing back data into the buffer RAM 12, through the buffer manager 11.

After the error correction by the second decoder 9, the data is read out by the buffer manager 11 and transmitted through the host interface 13 to an outside host computer HC. The host interface 13 which works as an interface to the host computer HC conforms to standards such as AT Attachment Packet Interface (ATAPI) or Small Computer System Interface (SCSI).

In a writing operation for writing data onto the optical disk 2 (i.e., a data recording process), the optical pickup 6 reads out a wobble signal and a land pre-pit signal from the optical disk 2. The wobble signal is then input into the third decoder 14. The wobble signal transmitted from the read amplifier 7 to the write clock generator 15 is referred to as a wobble signal WOB, and the land pre-pit signal is referred to as a land pre-pit signal LPP. The third decoder 14 demodulates the input wobble signal to generate a synchronous signal, time information, and ID information and outputs the generated information to the second encoder 17. The write clock generator 15 receives a predetermined system clock signal CLK (FIG. 2) used as a reference signal from outside. The write clock generator 15 also receives from the read amplifier 7 the wobble signal WOB when the optical disk 2 is a CD-R/RW or a DVD+R/RW, or the wobble signal WOB and the land pre-pit signal LPP when the optical disk 2 is a DVD-R/RW.

The write clock generator 15 uses the input signals (i.e., the system clock signal CLK, the wobble signal WOB, and the land pre-pit signal LPP) to generate a channel clock signal adequate to a data recording speed on the optical disk 2. The channel clock signal is output to the second encoder 17. The second encoder 17 refers to information from the third decoder 14 to obtain an accurate start position for writing onto the optical disk 2.

However, in a case like an additional recording in which data is written onto an area next to a preceding area where data is already recorded on the optical disk 2, quality of the wobble signal WOB may be too low for the third decoder 14 to generate an accurate synchronous signal, time information, and ID information. To avoid the problem, the recorded area on the optical disk 2 includes subcode data as well as a subcode synchronization for a synchronization signal in a case of a CD format, for example. It is therefore possible to adjust a start position for recording by using the information such as the subcode synchronization, subcode data, and ID information.

The data to be written onto the optical disk 2 is transmitted from the host computer HC to the buffer RAM 12 through the host interface 13 and the buffer manager 11. The first encoder 16 reads out the data from the buffer RAM 12 through the buffer manager 11. The first encoder 16 adds to the data an error correction code, an error detection and correction (EDC) code, a SYNC code, header information, ID information, and so forth, and writes back data with the added information to the buffer RAM 12.

The first encoder 16 reads out the prepared data from the buffer RAM 12 through the buffer manager 11 and, if the optical disk 2 has a CD format, writes the data to a RAM (not shown) for a CIRC operation in the second encoder 17. If the optical disk 2 has a CD format, the second encoder 17 carries out the CIRC operation on the data in the RAM for the CIRC operation by adding an error correction code and interleaving, and performs the EFM modulation to output the resultant data. If the optical disk 2 has a DVD format, the second encoder 17 carries out the eight-to-sixteen modulation to output the resultant data. The data output from the second encoder 17 is recorded onto the optical disk 2 through the laser control circuit 18 and the optical pickup 6.

The CPU 20 controls operations of the first decoder 8, the second decoder 9, the host interface 13, the third decoder 14, the first encoder 16, the second encoder 17, and so forth, using the ROM 21 and the RAM 22. In data reproduction or data recording, the CPU 20 monitors current status and issues various commands.

Figure 2:
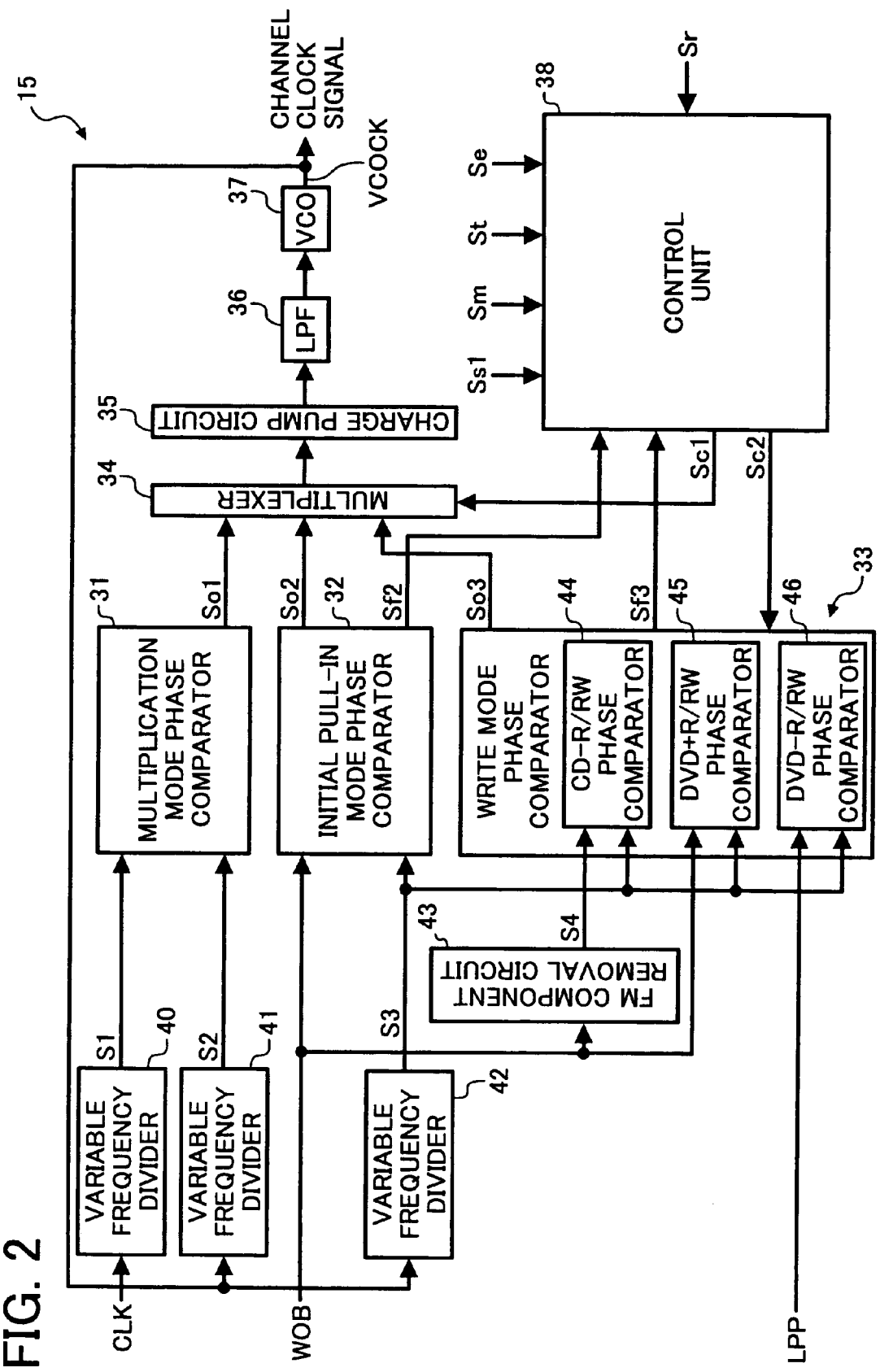
FIG. 2 is a block diagram showing an exemplary structure of a write clock generator of the optical recording apparatus shown in FIG. 1.

In FIG. 2, the write clock generator 15 forms a PLL circuit. The write clock generator 15 includes a multiplication mode phase comparator 31, an initial pull-in mode phase comparator 32, a write mode phase comparator 33, a multiplexer 34, a charging pump circuit 35, a low pass filter (LPF) 36, a voltage controlled oscillator (VCO) 37, a control circuit 38, variable frequency dividers 40-42, and an FM component removal circuit 43. The write mode phase comparator 33 includes a CD-R/RW phase comparator 44, a DVD+R/RW phase comparator 45, and a DVD-R/RW phase comparator 46.

The multiplication mode phase comparator 31 compares phases and frequencies between a frequency-divided signal S1 and a frequency-divided signal S2, and outputs the comparison results as an error signal So1 to the multiplexer 34. Here, the frequency-divided signal S1 is obtained by a one-Nth frequency division on a predetermined reference signal CLK, which is input from outside, by the variable frequency divider 40. The frequency-divided signal S2 is obtained by one-Mth frequency division on a channel clock signal VCOCK, which is output from VCO 37, by the variable frequency divider 41. Frequency of the channel clock signal VCOCK is obtained by an expression Fr×M/N, where Fr represents frequency of the reference clock signal CLK. Each division ratio of the variable frequency dividers 40 and 41 is determined according to the recording speed at which the optical disk recording apparatus 1 writes data onto the optical disk 2.

The initial pull-in mode phase comparator 32 compares phases and frequencies between the wobble-signal WOB and a frequency-divided signal S3, and outputs the comparison results as an error signal So2 to the multiplexer 34. Here, the wobble signal WOB is detected from the recording medium on which recording is performed (i.e., the optical disk 2), while the frequency-divided signal S3 is obtained by a frequency division on the channel clock signal VCOCK from the VCO 30 by the variable frequency divider 42. The initial pull-in mode phase comparator 32 also outputs a frequency differential signal Sf2, which shows a difference in frequencies between the wobble signal WOB and the frequency-divided signal S3, to the control circuit 38. Division ratio of the variable frequency divider 42 is determined according to a type of medium of the optical disk 2.

The write mode phase comparator 33 exclusively activates any one of the CD-R/RW phase comparator 44, the DVD+R/RW phase comparator 45, or the DVD-R/RW phase comparator 46, according to the selection signal Sc2 being input from the control circuit 38. Consequently, the write mode phase comparator 33 thus switches target signals and compares the phases and frequencies of the target signals according to a type of medium of the optical disk 2, and outputs the comparison results as an error signal So3 to the multiplexer 34. The write mode phase comparator 33 also outputs a difference of frequencies between the target signals as a frequency differential signal Sf3 to the control circuit 38.

Specifically, in a case of CD-R/RW where frequency of the wobble signal WOB is modulated, the FM component removal circuit 43 removes a frequency modulation component from the wobble signal WOB to output a signal S4. The CD-R/RW phase comparator 44 then compares phases and frequencies between the signal S4 and the frequency-divided signal S3, and outputs the comparison results as an error signal So3 to the multiplexer 34. Here, the frequency-divided signal S3 is obtained by frequency division on the channel clock signal VCOCK from the VCO 30 by the variable frequency divider 42. The CD-R/RW phase comparator 44 also generates a signal showing a difference in frequencies between the signal S4 and the frequency-divided signal S3, and output the generated signal to the control circuit 38 as a frequency differential signal Sf3.

The DVD+R/RW phase comparator 45 compares phases and frequencies between the wobble signal WOB and the frequency-divided signal S3, and outputs the comparison results as an error signal So3 to the multiplexer 34. The DVD+R/RW phase comparator 45 also generates a signal showing a difference in frequencies between the wobble signal WOB and the frequency-divided signal S3, and output the generated signal as a frequency differential signal Sf3 to the control circuit 38. The DVD-R/RW phase comparator 46 compares phases and frequencies between the land pre-pit signal LPP and the frequency-divided signal S3, and outputs the comparison results as an error signal So3 to the multiplexer 34. The DVD-R/RW phase comparator 46 also generates a signal showing a difference in frequencies between the land pre-pit signal LPP and the frequency-divided signal S3, and outputs the generated signal to the control circuit 38 as a frequency differential signal Sf3.

The multiplexer 34 selects one signal among input error signals So1 through So3 according to a type of medium of the optical disk 2 for recording and to the control signal input from the control circuit 38. The selected signal is exclusively output to the charging pump circuit 35. A signal output from the charging pump circuit 35 is smoothed and is output to the VCO 37 as a control voltage. The VCO 37 generates a channel clock signal VCOCK according to the input control voltage, and outputs a voltage which is used as a channel clock signal to control the writing operation over the optical disk 2. Besides, the channel clock signal used for the writing control over the optical disk 2 may be obtained by a frequency division on the signal VCOCK output from the VCO 37 with the variable frequency dividers. The control circuit 38 is able to cause the multiplexer 34 to stop outputting a signal by using the control signal Sc1, in some cases described below.

The control circuit 38 receives from the CPU 20 in FIG. 1 a CAV/CLV selection signal Ss1, a medium specification signal Sm, a tracking signal St, an error signal Se, and a reset signal Sr. The CAV/CLV selection signal Ss1 represents which method between CAV and CLV is used for recording onto the optical disk 2. The medium specification signal Sm specifies a type of medium of the optical disk 2. The tracking signal St indicates whether or not tracking is successfully carried out. The error signal Se represents a predetermined error signal. The reset signal Sr indicates execution of a predetermined reset operation. The control circuit 38 generates and outputs the control signal Sc1 to the multiplexer 34, by referring to the CAV/CLV selection signal Ss1, the tracking signal St, and the error signal Se. The control circuit 38 also outputs the selection signal Sc2 corresponding to the medium specification signal Sm to the write mode phase comparator 33. The tracking signal St and the error signal Se may be output from the servo circuit 5 to the control circuit 38.

Figure 3:
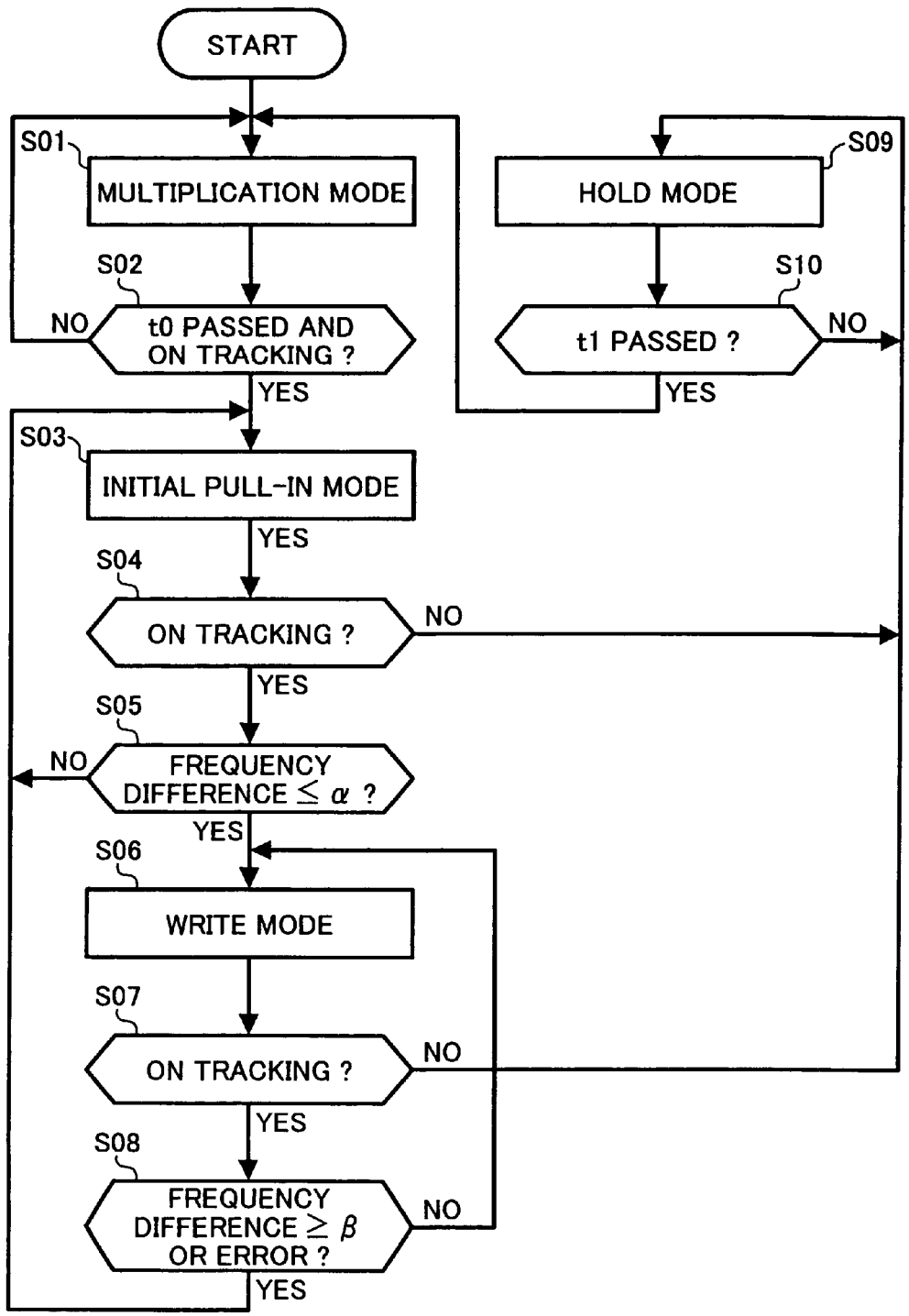
FIG. 3 is a flowchart showing an exemplary operation of a control unit of the optical recording apparatus shown in FIG. 2.

FIG. 3 is a flowchart showing an example recording operation of the control circuit 38 according to the above-described configuration. By referring to FIG. 3, the operation of the control circuit 38 will be described in detail.

In Step S01, the reset signal Sr is asserted from the CPU 20, the control circuit 38 enters a multiplication mode as an initial state causing multiplexer 34 to exclusively output the error signal So1 from the multiplication mode phase comparator 31 to the charging pump circuit 35. The multiplication mode is provided in cases of a recording process of the CLV method requiring a channel clock signal with constant frequency and a recording process of the CAV method to prevent the PLL being unstable when the wobble signal WOB or the land pre-pit signal LPP becomes inaccurate due to the initial pull-in, an off-track error, an off-servo error, and so forth.

In Step S02, in the CAV recording method, the control circuit 38 then checks whether or not a predetermined time t0 has passed and tracking is successfully carried out. The time t0 is to a locktime of the PLL in the multiplication mode. When the time t0 has passed and the tracking is successfully carried out, the result of Step S02 is YES and the process proceeds to Step S03. In Step S03, the control circuit 38 enters an initial pull-in mode causing the multiplexer 34 to exclusively output the error signal So2 from the initial pull-in mode phase comparator 32 to the charging pump circuit 35. In the initial pull-in mode, the VCO 37 outputs a signal VCOCK in synchronization with the wobble signal WOB detected from the optical disk 2. The signal clock VCOCK is referred to as a channel clock signal required for the recording process. When the time t0 has not passed or the time t0 has passed but the tracking is not successfully carried out, the result of Step S03 is NO and the process returns to the Step S01.

Then, in Step S04, the control circuit 38 in the initial pull-in mode checks whether or not the tracking is successfully carried out. When tracking is successfully carried out, the result of Step S04 is YES and the process proceeds to Step S05. In Step S05, the control circuit 38 detects the frequency differential signal Sf2 input from the initial pull-in mode phase comparator 32 to check whether or not the difference indicated by the frequency differential signal Sf2 is smaller than or equal to a predetermined setting value α. The setting value α indicating a frequency range is determined in consideration of a capture range and a pull-in speed of the write mode. In Step S05, when the difference in frequencies is greater than the setting value α, the result of Step S05 is NO and the process returns to Step S03. If the difference in frequencies is smaller than or equal to the setting value α, the result of Step S05 is YES and the process proceeds to Step S06. In Step S06, the control circuit 38 enters a write mode causing the multiplexer 34 to exclusively output the error signal So3 from the write mode phase comparator 33 to the charging pump circuit 35.

In the write mode, the write mode phase comparator 33 compares phases and frequencies between one of the wobble signal WOB and the land pre-pit signal LPP detected from the optical disk 2 and the frequency-divided signal So3, and generates the error signal So3. The error signal So3 is output through the multiplexer 34, the charging pump circuit 35, and the LPF 36 to the VCO 37 where the signal VCOCK is generated. In the write mode, the signal VCOCK in synchronization with the wobble signal WOB or the land pre-pit signal LPP detected from the optical disk 2 is generated. A channel clock signal required for the recording process on the optical disk 2 is thus obtained. In contrast to the initial pull-in mode in which the channel clock signal is generated by pulling in frequencies to some degree, in the write mode, the channel clock signal for writing data onto the optical disk 2 is generated by pulling in phases and frequencies with more accuracy.

Then, in Step S07, the control circuit 38 in the write mode checks whether or not the tracking is successfully carried out. When tracking is successfully carried out, the result of Step S07 is YES and the process proceeds to Step S08. In Step S08, the control circuit 38 detects the frequency differential signal Sf3 input from the initial pull-in mode phase comparator 33 to check whether or not the difference indicated by the frequency differential signal Sf3 is greater than or equal to a predetermined setting value β which is smaller than the setting value α, and whether or not any error is detected such as a spindle error, a servo error including an off-track error, or any other abnormal conditions during the writing process.

The setting value β is set to a value of frequency variation which is allowed in the writing process to assure the writing quality. When the difference in frequencies is determined as being greater than or equal to the predetermined setting value β or when any of the errors is detected in Step S08, the result of Step S08 is YES and the process returns to Step S03. When the difference in frequencies is determined as greater than or equal to the predetermined setting value β and/or when none of the errors is detected, the result of Step S08 is NO and the process returns to Step S06.

In the meanwhile, when tracking is determined as not successfully carried out in Step S04 or Step S07, the result of Step S04 or Step S07 is NO and the process proceeds to Step S09. In Step S09, the control circuit 38 enters a hold mode causing the multiplexer 34 to stop outputting a signal to the charging pump circuit 35. The hold mode is provided in order to maintain the PLL frequency, i.e., the frequency of the signal VCOCK. During the hold mode, the multiplexer 34 stops outputting one of the error signals to the charging pump circuit 35.

Then, in Step S10, the control circuit 38 in the hold mode checks whether or not a predetermined time t1 has passed. When the time t1 has not passed, the result of Step S10 is NO and the process returns to Step S09. When the time t1 has passed, the result of Step S10 is YES and the process returns to Step S01. The time t1 may be set to such a time period in which the PLL can hold the current frequency. This is to increase the pull-in speed of the PLL by pulling in the frequency previously used in a case of a short track jump, for example, in which the channel clock signal required for a next writing process does not vary much in frequency.

An ideal transition order of a state from initial to ready-to-write onto the optical disk 2 is the multiplication mode of Step S01, the initial pull-in mode of Step S03, and the write mode of Step S06. In a basic operation, when the tracking is successfully carried out, the wobble signal WOB or the land pre-pit signal LPP is detected so that the process enters the write mode. On the contrary, in a case of an off-track error in a seek operation or the like where neither the wobble signal WOB nor the land pre-pit signal LPP can be detected, the process enters the multiplication mode in order to prevent the PLL from being unstable. However, in a case of a short track jump or the like in which a time period of an off-track error is rather short, the process preferably enters the hold mode in which fluctuations of the PLL frequency are restrained.

The transition process shown in FIG. 3 is controlled with the control circuit 38. As an alternative, some part can be set manually. When the process is manually set to the initial pull-in mode, and the successive process is set as automatic, for example, the process starts at the initial pull-in mode of Step S03 in FIG. 3.

As described above, in the optical disk recording apparatus according to the embodiment of the present specification, the control circuit 38 automatically switches among the error signal So1 from the multiplication mode phase comparator 31, the error signal So2 from the initial pull-in mode phase comparator 32, and the error signal So3 from the write mode phase comparator 33 output signal to the charging pump circuit 35, according to a state of the wobble signal WOB or the land pre-pit signal LPP. It is therefore possible to reduce settling time required for obtaining a stable channel clock signal from the wobble signal or land pre-pit signal detected from the optical disk 2. Consequently, the optical disk recording apparatus 1 can generate the channel clock signal with more accuracy and stability.

Numerous additional modifications and variations are possible in light of the above teachings. It is therefore to be understood that within the scope of the appended claims, the disclosure of this patent specification may be practiced otherwise than as specifically described herein.

This patent specification is based on Japanese patent application, No. JPAP2002-345918 filed on Nov. 28, 2002 in the Japanese Patent Office, the entire contents of which are incorporated by reference herein.

What is claimed is:

1. An optical disk recording apparatus, which records information on a recordable optical disk employing a constant angular velocity recording method and includes a clock signal generator for generating a write reference clock signal used for obtaining recording timing in a data-recording operation on the optical disk, the clock signal generator comprising:

a first comparator configured to compare phases and frequencies between a frequency-divided signal of a predetermined reference clock signal input from outside and a frequency-divided signal of the write reference clock signal, and to output a first error signal representing comparison results;

a second comparator configured to compare phases and frequencies between a wobble signal recorded beforehand on the optical disk and the frequency-divided signal or the write reference clock signal, and to output a second error signal representing comparison results and a first frequency differential signal representing a frequency difference;

a selection circuit configured to select any one of the first and second error signals output from the first and second comparators, respectively, and to exclusively output the signal selected;

a control voltage generator configured to generate a control voltage from the signal output from the selection circuit, and to output the control voltage;

a voltage control oscillator configured to generate and output the write reference clock signal having a frequency corresponding to the control voltage input from the control voltage generator; and a control circuit configured to control operations of the selection circuit according to the first frequency differential signal.

2. The optical disk recording apparatus of claim 1, further comprising:

a first variable frequency divider configured to divide the predetermined reference clock signal according to a first division ratio, and output the first frequency-divided signal generated thereby; and a second variable frequency divider configured to divide the write reference clock signal according to a second division ratio, and output the second frequency-divided signal generated thereby, wherein said first and second division ratios are determined according to a recording speed of the optical disk recording apparatus.

3. The optical disk recording apparatus of claim 1, further comprising:

a variable frequency divider configured to divide the write reference clock signal according to a division ratio, and output the third frequency-divided signal generated thereby, wherein said division ratio is determined according to a medium type of the optical disk.

4. The optical disk recording apparatus of claim 3, further comprising:

a write mode phase comparator configured to compare phases and frequencies between one of the wobble signal and a second signal recorded beforehand on the optical disk on the one hand and the third frequency-divided signal from the variable frequency divider, and output a third error signal representing comparison results and a second frequency differential signal representing a frequency difference, wherein said selection circuit selects any one of the first through third error signals, based on a first selection signal from said control circuit.

5. The optical disk recording apparatus of claim 4, wherein said write mode phase comparator receives a second selection signal from said control circuit and operates according to the medium type of the optical disk.

6. An optical disk recording apparatus, which records information on a recordable optical disk employing a constant angular velocity recording method and includes a clock signal generator for generating a write reference clock signal used for obtaining recording timing in a data-recording operation on the optical disk, the clock signal generator comprising:

multiplication mode phase comparator means for comparing phases and frequencies between a first frequency-divided signal of a predetermined reference clock signal input from outside and a second frequency-divided signal of the write reference clock signal, and outputting a first error signal representing comparison results;

initial pull-in mode phase comparator means for comparing phases and frequencies between a wobble signal recorded beforehand on the optical disk and a third frequency-divided signal of the write reference clock signal, and outputting a second error signal representing comparison results and a first frequency differential signal representing a frequency difference;

multiplexer means for selecting any one of the first error signal from the multiplication mode phase cormparator means and the second error signals from the initial pull-in mode phase comparator means, and exclusively outputting the selected signal;

control voltage generator means for generating a control voltage from the selected signal output from the multiplexer means, and outputting the control voltage;

voltage control oscillator means for generating and outputting the write reference clock signal having a frequency corresponding to the control voltage from the control voltage generator means; and control means for controlling operations of the multiplexer means according to the first frequency differential signal.

7. The optical disk recording apparatus of claim 6, further comprising:

first variable frequency divider means for dividing the predetermined reference clock signal according to a first division ratio, and outputting the first frequency-divided signal thereby second variable frequency divider means for dividing the write reference clock signal according to a second division ratio, and outputting the second frequency-divided signal thereby, wherein said first and second division ratios are determined according to a recording speed of the optical disk recording apparatus.

8. The optical disk recording apparatus of claim 6, further comprising:

variable frequency divider means for dividing the write reference clock signal according to a division ratio, and outputting the third frequency-divided signal thereby, wherein said division ratio is determined according to a medium type of the optical disk.

9. The optical disk recording apparatus of claim 8, further comprising:

write mode phase comparator means for comparing phases and frequencies between one of the wobble signal and a second signal recorded beforehand on the optical disk on the one hand and the third frequency-divided signal from the variable frequency divider means, and outputting a third error signal representing comparison results and a second frequency differential signal representing a frequency difference, wherein said multiplexer means selects any one of the first through third error signals. based on a first selection signal born said control means.

10. The optical disk recording apparatus of claim 9, wherein said write mode phase comparator moans receives a second selection signal from said control means and operate according to the medium type of the optical disk.

* * * * *